US009875252B2

(12) United States Patent
Matsunaga

(10) Patent No.: US 9,875,252 B2
(45) Date of Patent: Jan. 23, 2018

(54) DATA PROCESSING APPARATUS USING CALCULATION OF HISTOGRAM INTERSECTION

(71) Applicant: CASIO COMPUTER CO., LTD., Shibuya-ku, Tokyo (JP)

(72) Inventor: Kazuhisa Matsunaga, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 272 days.

(21) Appl. No.: 14/805,019

(22) Filed: Jul. 21, 2015

(65) Prior Publication Data
US 2016/0078055 A1 Mar. 17, 2016

(30) Foreign Application Priority Data
Sep. 12, 2014 (JP) .................................. 2014-185783

(51) Int. Cl.
*G06F 17/30* (2006.01)
(52) U.S. Cl.
CPC .............................. *G06F 17/30244* (2013.01)
(58) Field of Classification Search
CPC .. G06K 9/4642; G06K 9/4652; G06K 9/4647; G06K 9/6215; G06K 9/6217; G06K 9/6201; G06F 17/3025; G06F 17/30277; G06F 17/30244

USPC ......................................................... 707/700
See application file for complete search history.

(56) References Cited

U.S. PATENT DOCUMENTS

| 2001/0017940 | A1* | 8/2001 | Kim ..................... G06F 17/3025 382/162 |
| 2002/0059206 | A1* | 5/2002 | Lee ...................... G06F 17/3025 |
| 2010/0113091 | A1* | 5/2010 | Sharma ................ G06K 9/4642 455/556.1 |
| 2012/0321181 | A1 | 12/2012 | Yang et al. |

OTHER PUBLICATIONS

Swain, et al., "Color Indexing", International Journal of Computer Vision, 7:1, 1991, pp. 11-32.

* cited by examiner

*Primary Examiner* — Evan Aspinwall
(74) *Attorney, Agent, or Firm* — Holtz, Holtz & Volek PC

(57) ABSTRACT

In a histogram intersection calculating apparatus, a histogram intersection calculating unit calculates a histogram intersection to compare histograms of query data and target data to obtain a score value of the histogram intersection. A calculation controlling unit makes the histogram intersection calculating unit calculate the histogram intersection in descending order of bin number of the histogram of the query data from the bin number having the maximum frequency value by using frequency values in the bin numbers of the query data and frequency values in the bin numbers of the target data to obtain a score value of the histogram intersection.

11 Claims, 9 Drawing Sheets

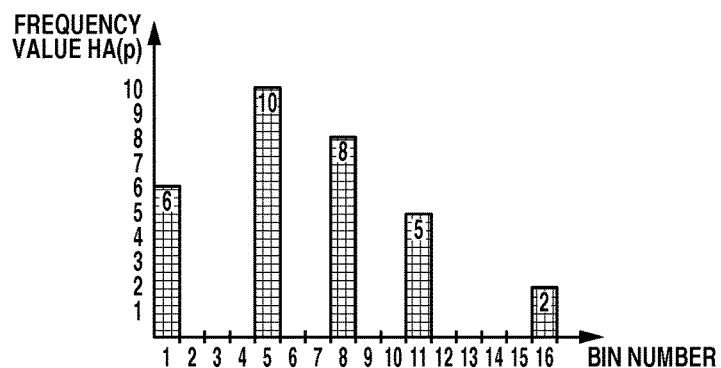
FIG.4A
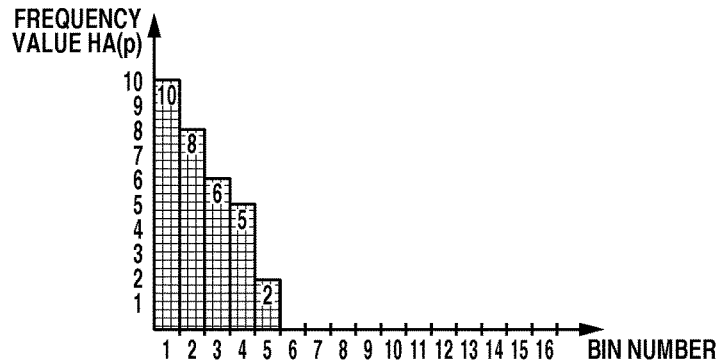
FIG.4B
FIG.4C
| REARRANGED BIN NUMBER (CONVERTED POINTER VALUE) | 1 | 2 | 3 | 4 | 5 |
|---|---|---|---|---|---|
| NOT-REARRANGED BIN NUMBER | 5 | 8 | 1 | 11 | 16 |
FIG.4D
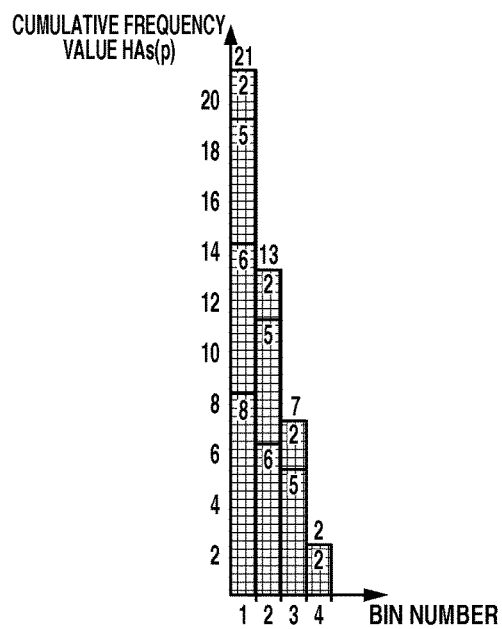

FIG.9

| SEQUENTIAL NUMBER (CALCULATION ORDER POINTER VALUE) | 1 | 2 | 3 | 4 | 5 |
|---|---|---|---|---|---|
| BIN NUMBER (BIN POINTER VALUE) | 5 | 8 | 1 | 11 | 16 |

DATA PROCESSING APPARATUS USING CALCULATION OF HISTOGRAM INTERSECTION

CROSS-REFERENCE TO RELATED APPLICATION

The present application is based upon and claims the benefit of priority from the prior Japanese Patent Application No. 2014-185783, filed Sep. 12, 2014, the entire contents of which are incorporated herein by reference.

BACKGROUND OF THE INVENTION

1. Field of the Invention

The present invention relates to a data processing apparatus using calculation of a histogram intersection.

2. Description of the Related Art

In a data collation process and a similar-data retrieval process of images, a query image and target images are compared. For comparing these images, a method of comparing histograms of these images has been proposed, such as proposed in "Swain, M. J. and Ballard, D. H.: Color Indexing, International Of Computer Vision, 7(1), pp. 11-32 (1991)". In the proposed method of comparing the histograms, frequency values in each of bins of both histograms are compared, and the smaller frequency value in each of the bins of the histograms are accumulated to obtain a score value. It is determined that if the score value is larger, then the similarity between the query image and the target image is at a higher level.

SUMMARY OF THE INVENTION

According to one aspect of the invention, therein provided a histogram intersection calculating apparatus which comprises a histogram intersection calculating unit which calculates a histogram intersection to compare a histogram of query data and a histogram of target data to obtain a score value of the histogram intersection, and a calculation controlling unit which makes the histogram intersection calculating unit calculate the histogram intersection in descending order of bin number from the bin number having the maximum frequency value of the histogram of the query data by using frequency values in the bin numbers of the query data and frequency values in the bin numbers of the target data, wherein the bin numbers of the target data correspond respectively to the bin numbers of the query data.

BRIEF DESCRIPTION OF THE DRAWINGS

FIG. 4A is a view showing an example of a query image VW histogram which has not yet been rearranged.

FIG. 4B is a view showing an example of the query image VW histogram which has been rearranged.

FIG. 4C is a view showing an example of a bin-number conversion table.

FIG. 4D is a view showing an example of a query image VW cumulative histogram.

FIG. 9 is a view showing an example of a calculation-order table.

DETAILED DESCRIPTION OF THE PREFERRED EMBODIMENTS

Figure 1:
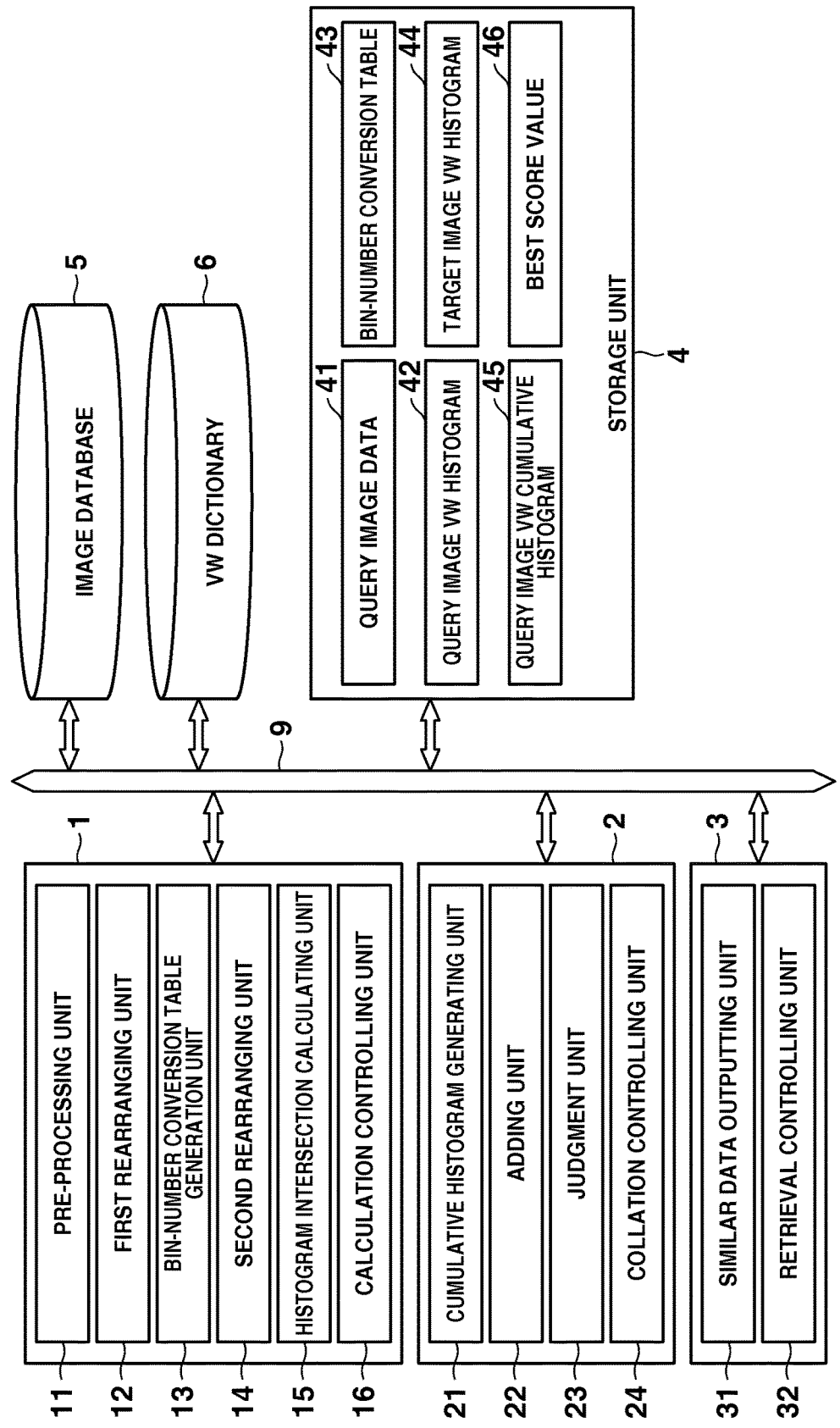
FIG. 1 is a view showing an example of a configuration of a similar-image data retrieval system according the first embodiment of the invention, including a histogram intersection calculating device, a data collating device, and a similar data retrieval device.

Now, the embodiments of the invention will be described with reference to the accompanying drawings in detail. In the description of the first, the second and the third embodiments of the invention, like elements are designated by like reference numerals.

First Embodiment of the Invention

FIG. 1 is a view showing an example of a configuration of a similar-image data retrieval system according the first embodiment of the invention, including a histogram intersection calculating device, a data collating device, and a similar data retrieval device. Upon receipt of a query image, the similar-image data retrieval system according the first embodiment of the invention retrieves the images similar to the query image among an image database 5 to return images similar to the query image.

As shown in FIG. 1, the histogram intersection calculating device according to the first embodiment is composed of a calculation unit 1 and a storage unit 4.

The calculation unit 1 comprises a pre-processing unit 11, a first rearranging unit 12, a bin-number conversion table generating unit 13, a second rearranging unit 14, a histogram intersection calculating unit 15, and a calculation controlling unit 16. The storage unit 4 is provided with a memory area where the calculation unit 1 can access. The storage unit 4 where the calculation unit 1 can access comprises a query image data storing area 41 where query image data is stored, a query image VW histogram storing area 42 where a query image VW histogram is stored, a bin-number conversion table storing area 43 where a bin-number conversion table generated by the bin-number conversion table generating unit 13 is stored, and a target image VW histogram storing area 44 where target image histograms are stored.

The data collating device according to the first embodiment is composed of a collation unit 2 and the storage unit 4. The collation unit 2 comprises the histogram intersection calculating device, a cumulative histogram generating unit 21, an adding unit 22, a judgment unit 23, and a collation controlling unit 24. The storage unit 4 is provided with the memory area where the collation unit 2 can access. The storage unit 4 where the collation unit 2 can access comprises a query image VW cumulative histogram storing area 45 where cumulative histograms generated by the cumulative histogram generating unit 21 are stored, and a best score-value storing area 46 where the best score value used by the judgment unit 23 is stored.

The similar data retrieval device according to the first embodiment is composed of a retrieval unit 3 and the storage unit 4. The retrieval unit 3 comprises a similar data outputting unit 31 and a retrieval controlling unit 32.

As described above, the storage unit 4 is shared by the histogram intersection calculating device, the data collating device, and the similar data retrieval device. Further, more particularly, the calculation unit 1, the collation unit 2, the retrieval unit 3 are realized by one or plural CPUs or MPUs, and elements of each unit are realized as functions of a program executed by the CPUs or MPUs.

The similar-image data retrieval system has a configuration including the image database 5 and a Visual Word dictionary (VW dictionary) 6 in addition to the configuration of the similar data retrieval device.

The calculation unit 1, the collation unit 2, the retrieval unit 3, the storage unit 4, the image database 5, and the VW dictionary 6 are connected to each other through a system bus 9 including a data bus and various sorts of control signal groups. Although not shown in FIG. 1, it is assumed that the similar-image data retrieval system is provided with an input/output unit for inputting a query image to the similar-image data retrieval system and/or outputting the result of the retrieval, and a user interface unit serving as an interface between a user and the system.

The image database 5 stores plural pieces of target image data to be retrieved. The target image data is represented using Bag-of-Features (BoF) of Bag-of-Words (visual words), that is, is represented as a histogram of visual words (target image VW histogram) indicating a distribution of local features extracted from the target image.

The VW dictionary 6 has registered therein all the visual words that are contained in the plural target images stored in the image database 5.

The units of the calculation unit 1 calculating the histogram intersection will be described.

The pre-processing unit 11 obtains image patch information (feature vectors) from each of intervals of the entered query image divided evenly from the image grid position, and refers each of the image patches to the VW dictionary 6 to create a query image VW histogram. Then, the created query image VW histogram is stored in the query image VW histogram storing area 42. At this time, the sequence of bin numbers in the query image VW histogram is the same as the target image VW histogram stored in the image database 5.

The first rearranging unit 12 rearranges the bins of the query image VW histogram in descending order of frequency value, whereby the query image VW histogram stored in the query image VW histogram storing area 42 will be re-written in descending order of frequency value.

The bin-number conversion table generating unit 13 generates a bin-number conversion table, which indicates to which bin numbers the bins of the query image VW histogram rearranged by the first rearranging unit 12 correspond respectively, before the query image VW histogram has been rearranged, and stores the generated bin-number conversion table in the bin-number conversion table storing area 43 of the storage unit 4. The bin-number conversion table is a correspondence table which indicates a relationship between the bin numbers (hereinafter, referred to as the "not-rearranged bin numbers") not yet subjected to rearrangement and the rearranged bin numbers, but only the bins whose frequency value is not 0 are included in the query image VW histogram (hereinafter, referred to as the "not-rearranged query image VW histogram") not yet subjected to rearrangement and the bins whose frequency value is 0 are excluded from the bin-number conversion table.

In calculating the histogram intersection, a function of "min( )" is used, and values returned from the function of "min( )" are successively accumulated, whereby a MIN cumulative value is obtained. If two parameters are provided to "min( )", "min( )" returns the smallest of these values. Therefore, if one of the parameters is 0, then "min( )" returns 0 and the MIN cumulative value will not change. In the case where two parameters are provided to "min( )" and one of them is 0, even if the calculation of the histogram intersection is omitted, no problem will occur. In the present embodiment of the invention, to accelerate the calculation of the histogram intersection or to calculate faster the histogram intersection, the bins whose frequency value is 0 in the not-rearranged query image VW histogram are excluded from the bin-number conversion table, and such bins are excluded from the calculation of the histogram intersection with no effect on the result of the calculation, reducing the number of calculation times or a calculation amount accompanied by the calculation of the histogram intersection.

As a result, in the calculation of histogram intersection to be performed with no effect on the result for data collation on one target image, if the number of items in the bin-number conversion table is P max (the maximum bin number in the rearranged target image VW histogram), the number of calculation times can be reduced to "P max".

The second rearranging unit 14 obtains the target image VW histogram of the target image to be retrieved from the image database 5, stores the obtained VW histogram in the target image VW histogram storing area 44 of the storage unit 4, and rearranges the bins of the target image VW histogram in accordance with the bin-number conversion table, whereby the rearranged bin numbers of the target image VW histogram storing area 44 will be the same as the rearranged bin numbers of the query image VW histogram stored in the query image VW histogram storing area 42.

When the second rearranging unit 14 rearranges the bins of the target image VW histogram, although it is possible for the second rearranging unit 14 to refer to all the frequency values of the bins, but when a frequency value of 0 falls in all the rearranged bin numbers of the target image VW histogram, it is preferable to cease a data collating process on the target image and the query image to perform the data collating process on another target image. In this case, since a similarity measure with such target image is null, the target image is excluded from the data collating process, whereby a more processing time can be reduced from the time required for the data collating process or for the whole similar-data retrieval process. In particular, in case of a query image having deviation in a distribution of local features, such a case often occurs, and it will be greater in effect to exclude such target image from the images to be subjected to the data collating process.

The histogram intersection calculating unit 15 calculates the histogram intersection between the query image VW histogram and the target image VW histogram rearranged by the second rearranging unit 14 sequentially in order from the bin of the maximum frequency value to the bin of a zero frequency value of the query image VW histogram rearranged by the first rearranging unit 12 to calculate a score value (a MIN cumulative value) of the histogram intersection.

The calculation controlling unit 16 controls operations (start, cease, and finish) of other units in the calculation unit 1 and also serves as an interface between the calculation unit 1 and other units composing the similar-image data retrieval system.

For instance, the calculation of the histogram intersection is performed by the histogram intersection calculating unit 15 under concurrency control in accordance with the converted pointer "p" (=1 to P max) of the calculation controlling unit 16. In other words, the histogram intersection calculating unit 15 operates the following formula (1) using the frequency value HA(p) in the bin number "p" of the query image VW histogram and the frequency value HB(p) in the bin number "p" of the target image VW histogram, where "p" is a converted pointer, to calculate a MIN cumulative value "Dp" (score value).

$$Dp = Dp-1 + \min(HA(p), HB(p)) \quad (1)$$

where D p−1 is the MIN cumulative value when the converted pointer is p−1.

The units of the collation unit 2 will be described, which cooperate with the calculation unit 1 to collate the query image with plural target images.

At first, the cumulative histogram generating unit 21 accumulates frequency values in the bin number and subsequent bin numbers of the query image VW histogram rearranged by the first rearranging unit 12 in order from the second bin to generate and store a query image VW cumulative histogram in the query image VW cumulative histogram storing area 45 of the storage unit 4.

As will be described later, in the case where it is determined to cease the calculation of the histogram intersection after the calculation has been performed only K times under control of a prescribed parameter of K, such histogram will be the query image VW cumulative histogram in which only the bin numbers corresponding to multiples of the parameter K have cumulative values, since cumulative values in the bin numbers other than the bin numbers corresponding to the multiples of the parameter K will not be referred to in the following calculation of the histogram intersection, whereby the accumulating calculation can be omitted and an area used for storing the histogram will be saved in the query image VW cumulative histogram storing area 45.

The adding unit 22 adds the score value (a MIN cumulative value for the bin number or a value of the converted pointer "p" at the time) calculated by the histogram intersection calculating unit 15 and the frequency value in the bin number (a value of the converted pointer "p") of the query image VW cumulative histogram generated by the cumulative histogram generating unit 21 to calculate an evaluation value Mul.

When the evaluation value Mul calculated by the adding unit 22 is smaller than the best score value stored in the best score-value storing area 46 of the storage unit 4, the judgment unit 23 ceases the calculation of the histogram intersection by the histogram intersection calculating unit 15. In this case, the judgment unit 23 gives the calculation controlling unit 16 notice of suspension of the calculation through the collation controlling unit 24, and the calculation controlling unit 16 ceases the calculation of the histogram intersection by the histogram intersection calculating unit 15.

In the best score-value storing area 46 are registered plural best score values, that is, the prescribed number of score values in descending order from the maximum score value of the histogram intersection, for instance, such as the "best ten". For example, this is applied to the case where plural images in order of similarity from the image most similar to the query image are shown to the user as a result of the similar image retrieval. In this case, before the number of best score values reaches the number of values which can be registered in the best score-value storing area 46, the calculating process is not ceased and is continued to be performed, and after the number of best score values has reached the number of values which can be registered in the best score-value storing area 46, the best score value is compared with the minimum value among the best score values stored in the best score-value storing area 46 to determine if the calculation should be ceased.

The meaning of the evaluation value Mul will be described. The frequency value in a bin of the query image VW cumulative histogram is an accumulated value in the corresponding bin number and the subsequent bin numbers of the query image VW histogram. Therefore, supposing that only a frequent value of the query image VW histogram is returned by the function of min( ) in the calculation of the histogram intersection for the bin number and subsequent numbers, the frequency value of the query image VW cumulative histogram corresponds to the frequent value returned by the function of min( ). Meanwhile, supposing that the other value is returned by the function of min( ) in the calculation of the histogram intersection for the bin number and subsequent numbers, a value smaller than the frequency value of the query image VW cumulative histogram is returned at all times. Therefore, the frequency value of the query image VW cumulative histogram corresponds to the upper limit of the sum of values returned from the function of min( ) in the calculation of the histogram intersection for the bin number and subsequent bin numbers. The evaluation value Mul obtained by adding the score value calculated by the histogram intersection calculating unit 15 and the frequency value in the bin number (a value of the converted pointer "p") of the query image VW cumulative histogram will correspond to the upper limit of the score value of histogram intersection calculated thereafter.

That is, during calculation of the histogram intersection, the upper limit of the score value of the histogram intersection is calculated, and it is judged if the calculated upper limit of the score value is larger than the best score. When it is determined that the calculated upper limit of the score value is not larger than the best score, the calculation of the histogram intersection for the relevant target image is ceased since the score value of the target image will by no means be registered in the best score-value storing area 46 of the storage unit 4.

As described above, the calculation of the histogram intersection will not be performed until the very end with respect to the target image whose score value will scarcely be larger than the best score value. It will be possible to reduce the number of calculation times to be performed or a calculation amount accompanied by the calculation of the histogram intersection by ceasing the calculation.

It is not always required to cease the calculation of the histogram intersection at every calculation for each bin number of the histogram, but it is possible to use the parameter "K" to suspend the calculation of the histogram intersection once in K times, where the parameter "K" is previously set by the user or in the system, on the basis of the number of bins of the query image VW histogram, the number of visual words, the number of best score values which can be registered in the best score-value storing area 46, and/or the number of images which can be shown to the user as a result of the retrieval.

It is possible for the judgment unit 23 to evaluate the evaluation value Mul not by comparing with the best score value registered in the best score-value storing area 46 but by comparing with a previously set value. For instance, when the user designates a query image together with a similarity level, a prescribed value is set in the system in accordance with the total frequency of the query image VW histogram and the similarity level, and the evaluation value Mul and the prescribed value are compared to determined whether or not the calculation of the histogram intersection is ceased.

When the final score value calculated by the histogram intersection calculating unit 15 is larger than the best score registered in the best score-value storing area 46, the judgment unit 23 renews the best score in the best score-value storing area 46.

In other words, when the evaluation value Mul calculated by the adding unit 22 is larger than the best score registered in the best score-value storing area 46, the judgment unit 23 judges whether the value of the converted pointer "p" (=1 to P max) is larger than P max, thereby determining whether the calculation of the histogram intersection has been completed for all the bin numbers.

When the converted pointer "p"=P max is true, and the calculation of histogram intersection has been completed for all the bin numbers, then, the MIN cumulative value DP max which has been calculated by the histogram intersection calculating unit 15 is used as the final score value obtained in the calculation of the histogram intersection, and is compared with the best score value registered in the best score-value storing area 46. When the final score value is larger than the best score value registered in the best score-value storing area 46, it is determined that the target image to be collated at the present time is more similar to the query image than the image corresponding to the best score value registered in the best score-value storing area 46, and the final score value is registered in the best score-value storing area 46 in place of the score value previously registered therein.

The collation controlling unit 24 controls operations of the units composing the collation unit 2, and also serves as an interface between the collation unit 2 and other units composing the similar-image data retrieval system.

For instance, the calculation is executed by the adding unit 22 under concurrency control in accordance with a value of the converted pointer "p" (=1 to P max) shared by the calculation controlling unit 16 and the collation controlling unit 24. That is, the evaluation value Mul is calculated by adding MIN cumulative value Dp and the frequency value HAs (p) in the bin number "p" of the query image VW cumulative histogram.

Units composing the retrieval unit 3 will be described, which cooperates with the calculation unit 1 and the collation unit 2 to retrieve images similar to the query image from among plural target images.

The similar-image data outputting unit 31 outputs the target image, concerning which the best score value has been calculated and registered in the best score-value storing area 46 as an image similar to the query image.

The retrieval controlling unit 32 controls operation of the similar-image data outputting unit 31 and also serves as an interface between the retrieval unit 3 and other units composing the similar-image data retrieval system.

Figure 2:
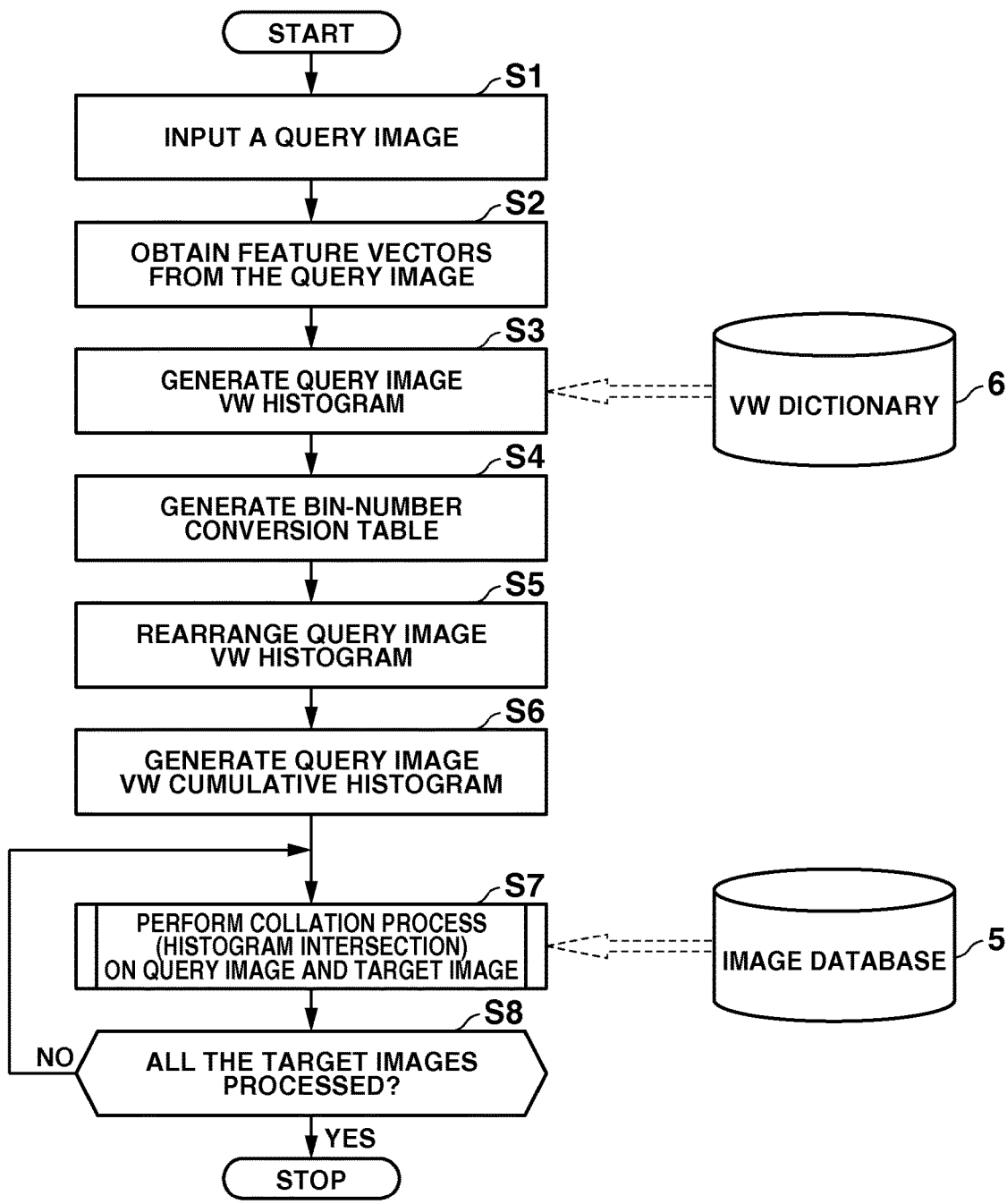
FIG. 2 is a flow chart of whole operation performed in the similar-image data retrieval system according to the first embodiment of the invention.
Figure 3:
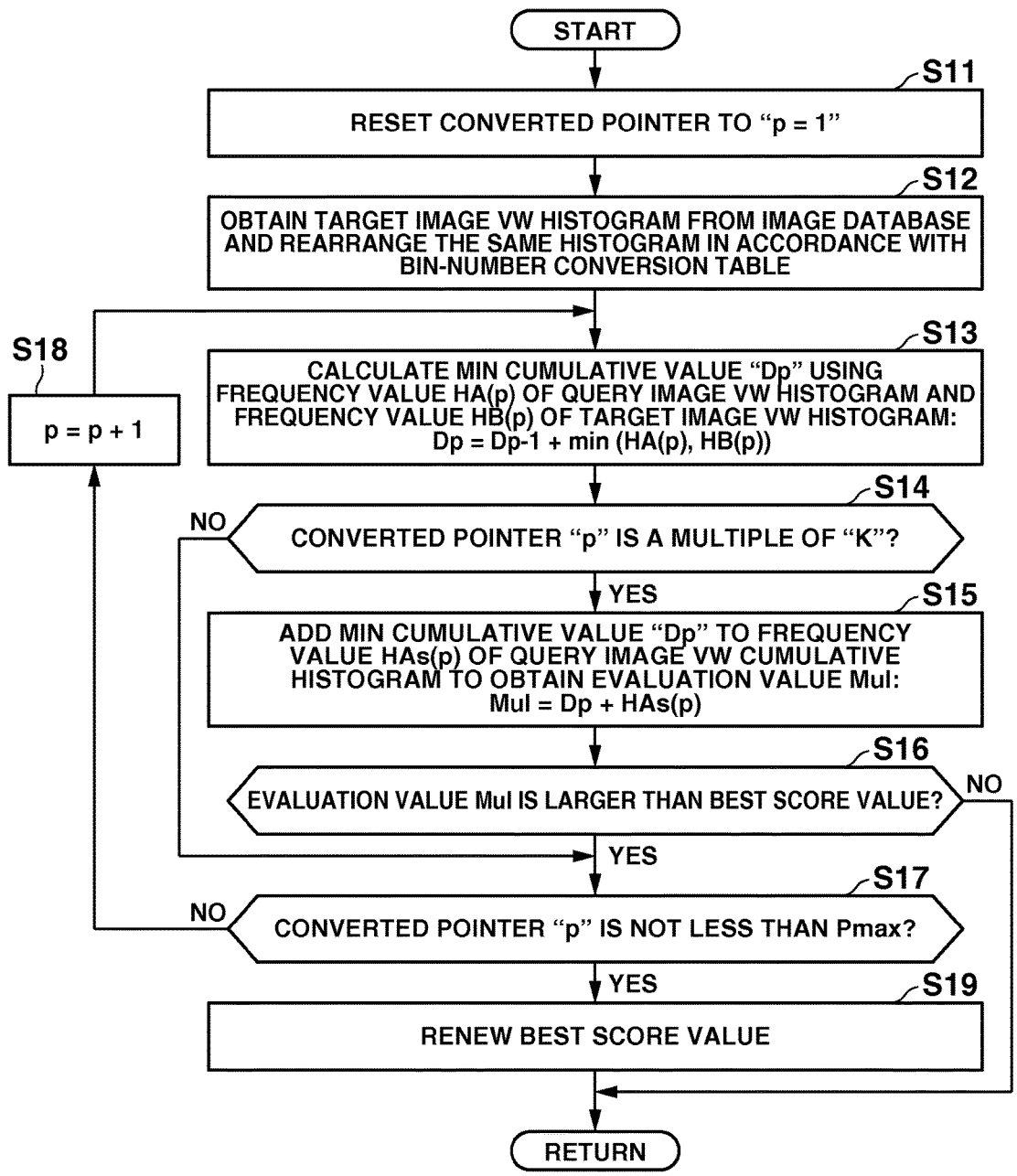
FIG. 3 is a flow chart of the calculation of the histogram intersection performed by the histogram intersection calculating device and the data collating device.

The operations of the histogram intersection calculating device, the data collating device, and the similar data retrieval device, provided with the units explained above, will be described with reference to FIG. 2, FIG. 3, FIG. 4A to FIG. 4D, and FIG. 5A to FIG. 5D in detail. FIG. 2 is a flow chart of the whole operation performed in the similar-image data retrieval system according to the first embodiment of the invention. FIG. 3 is a flow chart of the calculation of the histogram intersection performed by the histogram intersection calculating device and the data collating device.

Figure 5A:
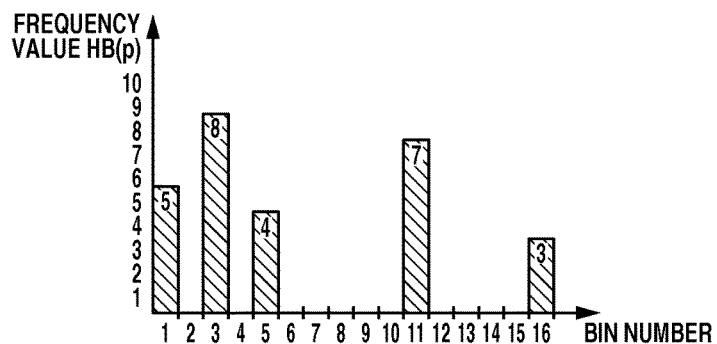
FIG. 5A is a view showing an example of a target image VW histogram which has not yet been rearranged.
Figure 5B:
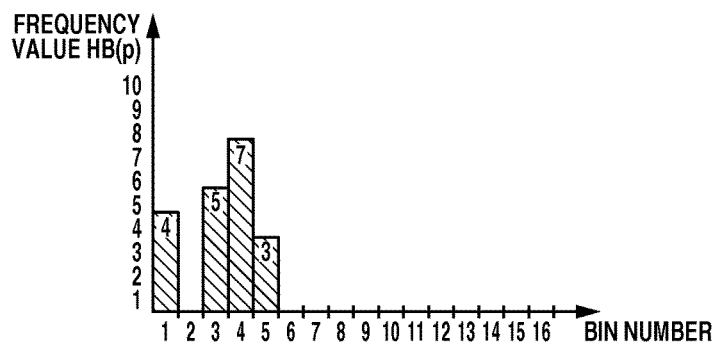
FIG. 5B is a view showing an example of the target image VW histogram which has been rearranged.
Figure 5C:
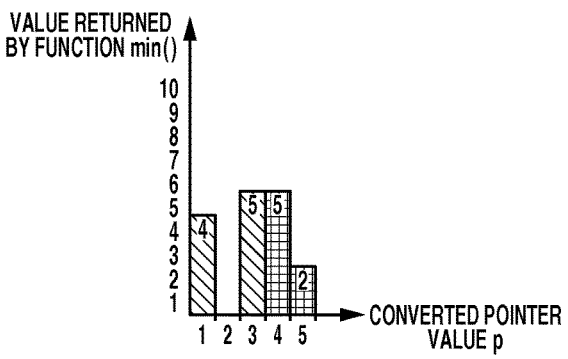
FIG. 5C is a view showing an example of values returned by a function of min( ).
Figure 5D:
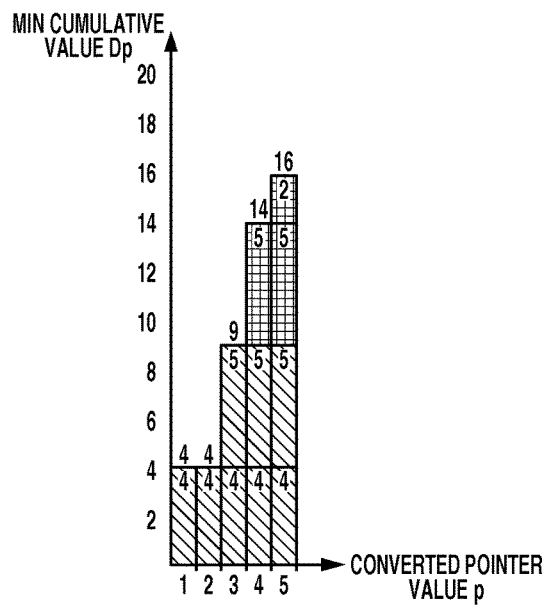
FIG. 5D is a view showing an example of MIN cumulative values.

FIG. 4A to FIG. 4D are views for specifically explaining the query image. FIG. 4A is a view showing an example of a query image VW histogram which has not yet been rearranged. FIG. 4B is a view showing an example of the query image VW histogram which has been rearranged. FIG. 4C is a view showing an example of a bin-number conversion table. FIG. 4D is a view showing an example of a query image VW cumulative histogram. FIG. 5A to FIG. 5D are views for specifically explaining the target image. FIG. 5A is a view showing an example of a target image VW histogram which has not yet been rearranged. FIG. 5B is a view showing an example of the target image VW histogram which has been rearranged. FIG. 5C is a view showing an example of values returned from the function of min( ). FIG. 5D is a view showing an example of MIN cumulative values. The specific examples shown in FIG. 4A to FIG. 4D and in FIG. 5A to FIG. 5D are prepared for easy understanding of the calculation of the histogram intersection executed in the present embodiment of the invention, and therefore, it should be noted that the minimum number of bins are prepared in the histogram for easy understanding and are not practical.

The operation of the similar-image data retrieval system will be described with reference to the flow chart of FIG. 2. At first, a query image is entered from the input/output unit (not shown) (step S1) and is stored in the query image data storing area 41 of the storage unit 4. The pre-processing unit 11 obtains image-patch information (feature vectors) of the entered query image from each of intervals evenly divided on the basis of the image grid position (step S2).

Further, the pre-processing unit 11 refers to the VW dictionary 6 to determine to which visual words the image patches belong respectively and generates a query image VW histogram, and then stores the query image VW histogram in the query image VW histogram storing area 42 of the storage unit 4 (step S3). In a specific example shown in FIG. 4A, the query image VW histogram is displayed, in which frequency values 6, 10, 8, 5 and 2 fall into the bin numbers 1, 5, 8, 11 and 16 of the query image VW histogram, respectively, and nothing falls into the other bin numbers. In prior learning, feature vectors of images for learning are subjected to clustering, to obtain plural clusters of feature vectors. The plural clusters of feature vectors each include visual words as the central word and are stored in the VW dictionary 6.

The first rearranging unit 12 rearranges the bins of the query image VW histogram in descending order of frequency value (step S5). In the specific example shown in FIG. 4B, the bin numbers 1 to 5 contain frequency values 10, 8, 6, 5 and 2 respectively, whereby the query image VW histogram with frequency values rearranged in descending order is obtained.

The bin-number conversion table generating unit 13 generates a bin-number conversion table that indicates to which bin numbers the bins of the query image VW histogram rearranged by the first rearranging unit 12 correspond respectively, before the bins are rearranged, and stores the generated bin-number conversion table in the bin-number conversion table storing area 43 of the storage unit 4 (step S4). Which process, the process at step S4 or the process at step S5, should be performed first is defined depending on an algorithm of a rearrangement process, and it will do either of the processes is performed first, while it is permitted that the both processes are performed simultaneously.

A specific example of the bin-number conversion table generated by the bin-number conversion table generating unit 13 is shown in FIG. 4C. The number of items in the bin-number conversion table (the maximum number of rearranged bin numbers) is 5, and the calculation of the histogram intersection will be performed 5 times (P max) at most in data collation executed on the query image and the target image. In other words, there are 11 bins whose frequency value is 0 in the query image VW histogram and these bins will be excluded from the calculation of the histogram intersection.

The cumulative histogram generating unit 21 accumulates frequency values falling in the bin number and succeeding bin numbers every bin number of the query image VW histogram rearranged by the first rearranging unit 12 to generate a query image VW cumulative histogram, and stores the generated query image VW cumulative histogram in the query image VW cumulative histogram storing area 45 of the storage unit 4 (step S6). A specific example of the query image VW cumulative histogram is shown in FIG. 4D.

Then, a collation process, including histogram intersection, is performed on the query image and the target images at step S7. FIG. 3 is a flow chart of the collation process (including the histogram intersection) at step S7 in FIG. 2.

The calculation controlling unit 16 and the collation controlling unit 24 reset the value of the converted pointer "p" (=1 to P max) to the initial value "1" (step S11 in FIG. 3). The converted pointers "p" are equivalent to the rearranged bin numbers, as shown in FIG. 4C, and indicate the order of the calculation of the histogram intersection to be executed.

The second rearranging unit 14 obtains from the image database 5 the target image VW histogram of the target image to be retrieved and stores the target image VW histogram in the target image VW histogram storing area 44 of the storage 4. Further, the second rearranging unit 14 rearranges the bins of the target image VW histogram in accordance with the bin-number conversion table stored in the bin-number conversion table storing area 43 of storage unit 4 (step S12).

In a specific example of the target image shown in FIG. 5A, a target image VW histogram is displayed, in which frequency values 5, 8, 4, 7 and 3 fall into the bin numbers 1, 3, 5, 11 and 16 respectively, and nothing falls into the other bin numbers. When the bin numbers are rearranged in accordance with the bin-number conversion table shown in FIG. 4C, the histogram shown in FIG. 5B will be obtained. In the target image VW histogram with rearranged bin numbers, the bin numbers 1 to 5 have frequency values 4, 0, 5, 7 and 3, respectively. The calculation of the histogram intersection will be executed for the bin numbers 1 to 5 of the rearranged query image VW histogram and the target image VW histogram.

Using the frequency value HA(p) in the bin number "p" of the query image VW histogram and the frequency value HB(p) in the bin number "p" of the target image VW histogram, the histogram intersection calculating unit 15 calculates the formula (1), $$Dp = Dp-1 + \min(HA(p), HB(p)) \quad (1)$$

and obtains MIN cumulative value "Dp" (score value) (step S13).

Using the specific example, the above calculation of the histogram intersection will be traced.

When the converted pointer "p"=1, the function min( ) returns HB(1)=4 for the frequency value HA(1)=10 in the bin number "1" of the query image VW histogram and the frequency value HB(1)=4 in the bin number "1" of the target image VW histogram, and MIN cumulative value D1=4 will be obtained. Further, when the converted pointer "p"=2, the function min( ) returns HB(2)=0 for the frequency value HA(2)=8 and the frequency value HB(2)=0, and MIN cumulative value D2=4 will be obtained. When the converted pointer "p"=3, the function min( ) returns HB(3)=5 for the frequency value HA(3)=6 and the frequency value HB(3)=5, and MIN cumulative value D3=9 will be obtained. When the converted pointer "p"=4, the function min( ) returns HB(4)=5 for the frequency value HA(4)=5 and the frequency value HB(4)=7, and MIN cumulative value D4=14 will be obtained. Further, when the converted pointer "p"=5, the function min( ) returns HA(5)=2 for the frequency value HA(5)=2 and the frequency value HB(5)=3, and MIN cumulative value D5=16 will be obtained. That is, for the target image of the specific example, the final score value is 16.

The transition of the values returned from the above function min( ) that is, the transition of the MIN cumulative values "Dp" (score values) is shown in FIG. 5D.

The collation controlling unit 24 judges at step S14 whether the converted pointer "p" is a multiple of "K", where the parameter "K" is a positive integer of 1 or larger, which is previously set by the user or depending on the system. The parameter "K" is used to control the following process at step S15 or step S16 such that the process is performed once in "K" times.

The adding unit 22 adds MIN cumulative value "Dp" for the bin number "p" (the score value calculated by the histogram intersection calculating unit 15) to the frequency value HAs (p) in the bin number of the query image VW cumulative histogram to obtain the evaluation value Mul (step S15).

Referring to the specific example, the calculation of the evaluation value Mul for each converted pointer "p" will be described. When the converted pointer "p"=1, MIN cumulative value D1=4 and the frequency value HAs(1)=21 in the bin number (1) of the query image VW cumulative histogram are added together, and the evaluation value Mul=25 is obtained. When the converted pointer "p"=2, MIN cumulative value D2=4 and the frequency value HAs(2)=13 in the bin number (2) of the query image VW cumulative histogram are added together, and the evaluation value Mul=17 is obtained. When the converted pointer "p"=3, MIN cumulative value D3=9 and the frequency value HAs(3)=7 in the bin number (3) of the query image VW cumulative histogram are added together, and the evaluation value Mul=16 is obtained. Further, when the converted pointer "p"=4, MIN cumulative value D4=14 and the frequency value HAs(4)=2 in the bin number (4) of the query image VW cumulative histogram are added together, and the evaluation value Mul=16 is obtained.

As described above, the evaluation value Mul is the upper limit value obtained when the subsequent calculation of the histogram intersection is further executed.

Therefore, it will be understood that every time the calculation of the histogram intersection is executed, the evaluation value Mul decreases successively to approach the final true value, and the evaluation value Mul will reach the MIN cumulative value, "D5=16", as shown in FIG. 5D.

The characteristic that the evaluation value Mul successively decreases and approaches the final score value is attributed to the fact that the query image VW histogram is rearranged in descending order of frequency value. As will be described later, the evaluation value Mul and the best score value are compared in the present embodiment to determine whether the calculation of histogram intersection is ceased or not. Using the characteristic that the evaluation value Mul decreases successively, it is possible to determine at an early stage to cease the calculation of the histogram intersection for the target image, on which the calculation will be ceased later as a consequence. In other words, the query image VW histogram rearranged in descending order of frequency value will make it possible to determine at an earlier stage to cease the calculation of the histogram intersection and allows to omit calculating processes, attributing in accelerating a processing speed.

The judgment unit 23 compares at step S16 the evaluation value Mul calculated at step S15 with the best score value stored in the best score-value storing area 46 of the storage unit 4. When it is determined that the evaluation value Mul is smaller than the best score value (NO at step S16), the judgment unit 23 ceases the calculation of the histogram intersection by the histogram intersection calculating unit 15, finishing the collation process of collating the target image with the query image (step S7 in FIG. 2).

When it is determined that the evaluation value Mul is larger than the best score value (YES at step S16), the judgment unit 23 judges at step S17 whether the value of the converted pointer "p" is not less than P max. When it is determined that the value of the converted pointer "p" is less than P max (NO at step S17), the calculation of histogram intersection has not been executed for all the bin numbers of the rearranged query image VW histogram and target image VW histogram, and then, the converted pointer "p" is incremented at step S18 and the process returns to step S13.

When it is determined that the converted pointer "p" reaches P max ("p"=P max) (YES at step S17), and the calculation of histogram intersection has been completed for all the bin numbers of the rearranged query image VW histogram target image VW histogram, then the judgment unit 23 advances to step S19, where the judgment unit 23 uses the MIN cumulative DP max calculated by the histogram intersection calculating unit 15 as the final score value obtained in the final calculation of histogram intersection to compare the same with the best score value. When the final score value is larger than the best score value, the judgment unit 23 replaces the best score value of the best score-value storing area 46 with the final score value (step S19).

In the histogram intersection calculating device according to the present embodiment, the first rearranging unit 12 rearranges the bins of the query image VW histogram in descending order of frequency value, and the bin-number conversion table generating unit 13 generates the bin-number conversion table that indicates to which bin numbers the bins of the rearranged query image VW histogram correspond respectively, before they are rearranged. The second rearranging unit 14 rearranges the bins of the target image VW histogram in accordance with the bin-number conversion table, and the histogram intersection calculating unit 15 calculates the histogram intersection between the rearranged query image VW histogram and target image VW histogram successively on the bins of the rearranged query image VW histogram from the bin having the maximum frequency value to the bin having null frequency value to obtain a score value (MIN cumulative value) of the histogram intersection.

Further, in the histogram intersection calculating device according to the present embodiment, when the bin-number conversion table indicating a relationship between the not-rearranged bin numbers and the rearranged bin numbers of the query image VW histogram is generated, since the bins whose frequency value is 0 are excluded from the query image VW histogram, before the bins of said histogram are rearranged, the bins whose frequency value is 0 are excluded from the calculation of the histogram intersection with no effect on the result of the calculation, and therefore the number of calculation times to be executed or a calculation amount accompanied by the calculation of the histogram intersection is more reduced, and the calculating speed is accelerated.

In the data collating device according to the present embodiment, the score values ranging from the best score value to a score value corresponding to a predetermined order among the score values of the histogram intersection calculated by the histogram intersection calculating device are stored in the best score-value storing area 46 of the storage unit 4. While the histogram intersection calculating device is executing the calculation of the histogram intersection to calculate a score value of the histogram intersection, the judgment unit 23 successively judges whether the calculated score value is larger than the best score value stored in the best score-value storing area 46 of the storage unit 4. When it is determined that the score value of the histogram intersection successively calculated by the histogram intersection calculating device will not be larger than the best score value stored in the best score-value storing area 46 of the storage unit 4, the histogram intersection calculating device ceases the calculation of the histogram intersection.

As described above, in the data collating device according to the present embodiment, when it is determined that the upper limit of the score value calculated during the calculation of the histogram intersection will not be larger than the best score stored in the best score-value storing area 46 of the storage unit 4, the calculation of the histogram intersection is ceased, and the collation process on the target image which will be hardly employed as an image similar to the query image at the end is discontinued during the calculation of the histogram intersection, and a useless calculation is omitted and the data collating process can be accelerated.

In the case that the data collating device searches for a target image corresponding to a score value of the histogram intersection falling within a range from the maximum score value to a score value of a predetermined order, as a result of executing the data collation process and the target image whose score value will not be stored in the best score-value storing area 46 of the storage unit 4 at the end, the data collating device determines during the calculation of the histogram intersection that the score value of said target image will not be stored in the best score-value storing area 46, and can suspend the calculation of the histogram intersection, reducing the number of calculation times to be executed or a calculation amount accompanied by the calculation of the histogram intersection, and accelerating the data collation process.

Further, in the data collating device according to the present embodiment, the cumulative histogram generating unit 21 generates the query image VW cumulative histogram with the rearranged bin numbers each having the accumulated frequency value falling in the bin number and subsequent bin numbers, and the adding unit 22 adds the score value calculated by the histogram intersection calculating device to the cumulative frequency value in the corresponding bin number of the query image VW cumulative histogram generated by the cumulative histogram generating unit 21 to obtain an evaluation value. When the evaluation value is smaller than the best score value stored in the best score-value storing area 46 of the storage unit 4, the histogram intersection calculating device ceases the calculation of the histogram intersection, or when the evaluation value is smaller than a prescribed value, the histogram intersection calculating device ceases the calculation of the histogram intersection.

In other words, the histogram intersection calculating device calculates the evaluation value as the upper limit of the score value, and when the calculated evaluation value is smaller than the best score value or the prescribed value, the calculation of the histogram intersection is ceased, and the whole number of calculation times accompanied by the calculation of the histogram intersection is decreased, whereby the data collation process is accelerated.

In the similar data retrieval device in the present embodiment of the invention, when the similar-image data outputting unit 31 outputs data similar to the query data out of plural pieces of target data, the target data, on which the best score value is calculated and stored in the best score-value storing area 46 of the storage unit 4 is output as the data similar to the query data.

The similar data retrieval device according to the present embodiment comprises the histogram intersection calculating device and the data collating device, and therefore, can execute the calculation of the histogram intersection effectively and can accelerate the data collation process and the similar data retrieval process without inviting deterioration in quality.

Second Embodiment of the Invention

The second embodiment of the invention will be described. What the second embodiment is different from the first embodiment is in that the calculation unit 1 has no second rearranging unit 14 and the storage unit 4 excludes the target image VW histogram storing area 44.

In the first embodiment, when the frequency values of the target image VW histogram are referred to in the calculation of the histogram intersection, the bin numbers of the target image VW histogram are rearranged and referred to in the target image VW histogram storing area 44 of the storage unit 4. On the contrarily, in the second embodiment, the target image VW histogram with not-rearranged bin numbers in the image database 5 is directly referred to, and the bin numbers of the histogram to be referred to are converted (conversion from the rearranged bin numbers to the not-rearranged bin numbers) with reference to the bin-number conversion table stored in the bin-number conversion table storing area 43.

The histogram intersection calculating unit 15 and the calculation controlling unit 16 in the calculation unit 1 which operate in a different manner from those in the first embodiment will be described hereinafter.

The histogram intersection calculating unit 15 calculates the histogram intersection between the query image VW histogram and the target image VW histogram to obtain a score value of the histogram intersection.

The calculation controlling unit 16 controls operations (start, cease, and finish) of other units in the calculation unit 1 and also serves as an interface between the calculation unit 1 and other units composing the similar-image data retrieval system.

In particular, the calculation of the histogram intersection is performed by the histogram intersection calculating unit 15 under concurrency control in accordance with the value of the converted pointer "p" (=1 to P max) of the calculation controlling unit 16. In other words, the calculation controlling unit 16 refers to the bin-number conversion table using the value of the converted pointer "p" to obtain a value of a not-converted pointer "q". Further, the calculation controlling unit 16 refers to the image database 5 using the value of the not-converted pointers "q", thereby obtaining a frequency value HB(q) in the bin number "q" of the target image VW histogram and sends the histogram intersection calculating unit 15 the obtained frequency value HB(q) in the bin number "q" of the target image VW histogram.

Using the frequency value HA(p) in the bin number "p" of the rearranged query image VW histogram stored in the query image VW histogram storing area 42, where "p" is a converted pointer, and the frequency value HB(q) in the bin number "q" of the target image VW histogram, the histogram intersection calculating unit 15 operates the following formula (2) to calculate a MIN cumulative value "Dp" (score value).

$$Dp=Dp-1+\min(HA(p),HB(q)) \quad (2)$$

Now, the operation of the histogram intersection calculating device, the data collating device, and the similar data retrieval device according the second embodiment of the invention will be described. The whole operation of the similar-image data retrieval system of the second embodiment is substantially the same as the operation in the first embodiment of the invention, and is performed in accordance with the flow chart of FIG. 2.

Figure 6:
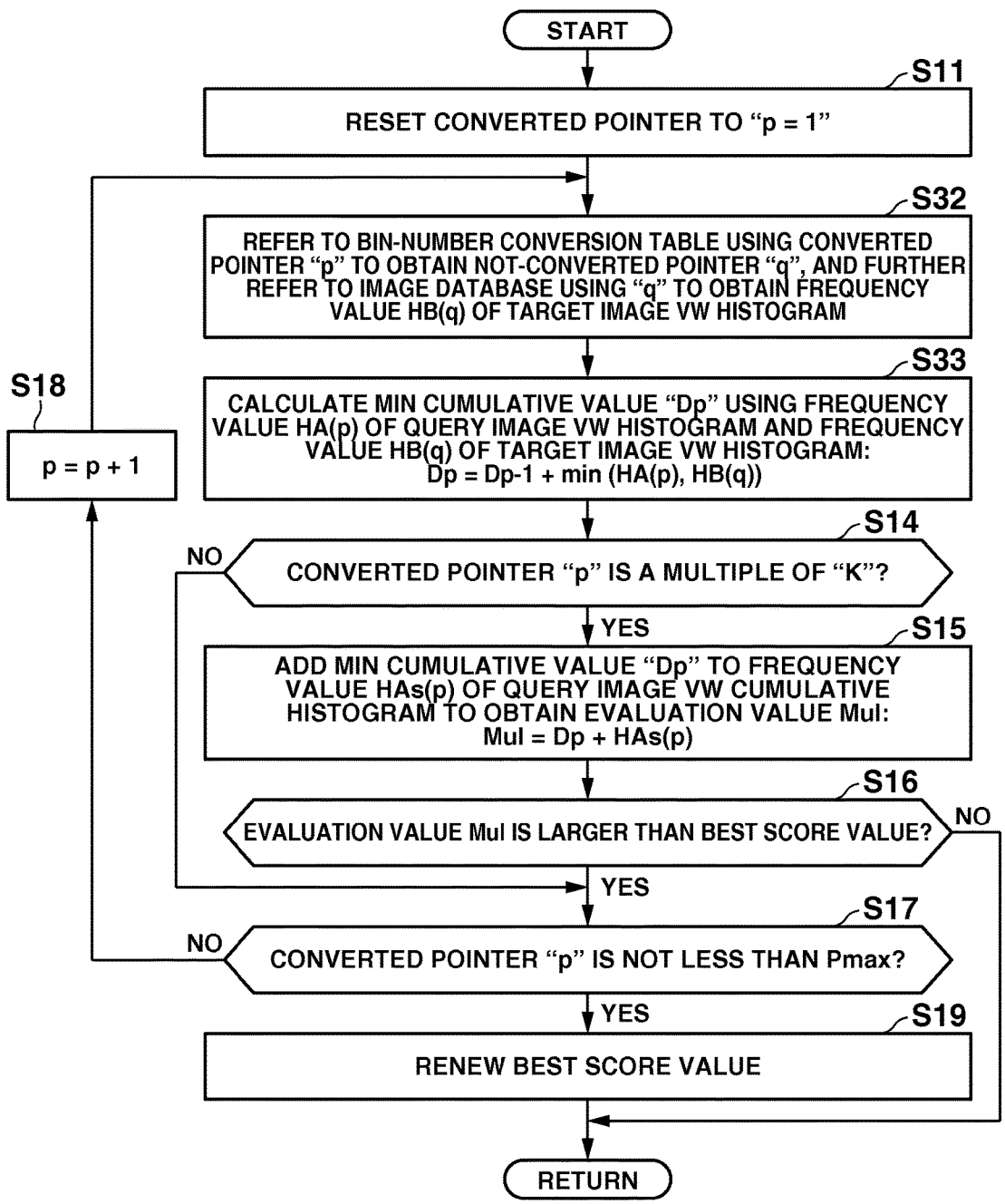
FIG. 6 is a flow chart of operation performed by the histogram intersection calculating device and the data collating device according to the second embodiment of the invention.

The collation process (step S7 in FIG. 2), including the calculation of the histogram intersection, performed on the query image and the target image, is performed in accordance with a flow chart shown in FIG. 6 in the present second embodiment. FIG. 6 is the flow chart illustrating the operation performed by the histogram intersection calculating device and the data collating device according to the second embodiment of the invention.

The calculation controlling unit 16 and the collation controlling unit 24 reset the value of the converted pointer "p" (=1 to P max) to the initial value "1" (step S11 in FIG. 6). The converted pointer "p" is equivalent to the rearranged bin number and indicates the order of the calculation of histogram intersection to be executed.

The calculation controlling unit 16 refers to the bin-number conversion table using the value of the converted pointer "p" to obtain a value of a not-converted pointer "q", and further refers to the image database 5 using the value of the not-converted pointer "q", thereby obtaining a frequency value HB(q) in the bin number "q" of the target image VW histogram (step S32) and sends the histogram intersection calculating unit 15 the obtained frequency value HB(q) in the bin number "q" of the target image VW histogram.

Using the frequency value HA(p) in the bin number "p" of the rearranged query image VW histogram stored in the query image VW histogram storing area 42, where "p" is a converted pointer, and the frequency value HB(q) in the bin number "q" of the target image VW histogram, the histogram intersection calculating unit 15 operates the following formula (2) to calculate a MIN cumulative value "Dp" (score value) (step S33).

$$Dp=Dp-1+\min(HA(p),HB(q)) \quad (2)$$

The processes to be performed at the remaining steps are substantially the same as the processes performed in the first embodiment, and therefore, further description thereof is omitted. But in the second embodiment of the invention, every time the histogram intersection is calculated, the frequency value HB(q) in the bin number "q" of the target image VW histogram to be used in such calculation is obtained from the image database 5, and therefore, when the calculation of histogram intersection has not been finished for all the bin numbers of the query image VW histogram and the target image VW histogram (NO at step S17), the converted pointer "p" is incremented at step S18, and the process returns to step S32.

As described above, in the histogram intersection calculating device of the second embodiment of the invention, the first rearranging unit 12 rearranges the bins of the query image VW histogram in descending order of frequency value, and the bin-number conversion table generating unit 13 generates the bin-number conversion table that indicates to which bin numbers the bins of the rearranged query image VW histogram correspond respectively, before the bins are rearranged. The calculation controlling unit 16 makes the histogram intersection calculating unit 15 calculate the histogram intersection by using the frequency value in the bin number of the rearranged query image VW histogram and the frequency value in the not-rearranged bin number of the target image VW histogram, wherein the not-rearranged bin number corresponds to the bin number which has not been rearranged in accordance with the bin-number conversion table, in order successively from the bin having the maximum frequency value to the bin having null frequency value of the rearranged query image VW histogram.

In the histogram intersection calculating device according to the second embodiment of the invention, when the bin-number conversion table indicating a relationship between the not-rearranged bin numbers and the rearranged bin numbers of the query image VW histogram is generated, since the bins whose frequency value is 0 are excluded from the query image VW histogram before the bins of said histogram are rearranged, the bins whose frequency value is 0 are excluded from the calculation of the histogram intersection with no effect on the result of the calculation, and therefore the number of calculation times or a calculation amount accompanied by the calculation of the histogram intersection is more reduced, and the calculating speed can be accelerated.

In comparison with the first embodiment of the invention, in the second embodiment every time the histogram intersection is calculated, the frequency value HB(q) in the bin number "q" of the target image VW histogram to be used in such calculation is obtained from the image database 5, and therefore, there is no need to rearrange the target image VW histogram, and the calculation of histogram intersection can be more accelerated compared with the calculation in the first embodiment.

In the second embodiment, since it is possible to delete the process of rearranging the target image VW histogram with respect to each of the target images which are processed as a processing unit by the data collation device, the data collating process can be accelerated, and also the similar data retrieval process can be accelerated in the similar data retrieval device.

Third Embodiment of the Invention

In the first embodiment, when the frequency values of the query image VW histogram are referred to in the calculation of the histogram intersection, the rearranged query image VW histogram is referred to in the query image VW histogram storing area 42 of the storage unit 4 On the contrarily, in the third embodiment, the bin numbers of the query image VW histogram are not rearranged, but a calculation-order table is created, and the query image VW histogram which has not yet been rearranged is referred to in accordance with the calculation-order table.

FIG. 9 is a view showing an example of the calculation-order table.

In the first embodiment, when the frequency values of the target image VW histogram are referred to in the calculation of the histogram intersection, the bin numbers of the target image VW histogram are rearranged and referred to in the target image VW histogram storing area 44 of the storage unit 4. On the other hand, in the third embodiment, the target image VW histogram in the image database, whose bin numbers have not yet been rearranged, is directly referred to as in the second embodiment, and when the bin numbers of the target image VW histogram are referred to, they are rearranged with reference to the calculation-order table.

The histogram intersection calculating unit 15 and the calculation controlling unit 16 in the calculation unit 1 which operate in a different manner from those in the first embodiment will be described. The calculation unit 1 rearranges the bin numbers of the query image VW histogram in descending order of frequency value, and assigns sequential numbers starting from 1 and incrementing by 1 to the rearranged bin numbers of the query image VW histogram respectively, excluding the bin numbers whose frequency value is 0, thereby creating the calculation order table.

As a specific example, when the calculation order table as described above is created with respect to the query image VW histogram shown in FIG. 4A (First Embodiment), the calculation order table will be shown in FIG. 9. The calculation order table will be the same as the bin number conversion table as shown in FIG. 4C, and the sequential numbers correspond to the bin numbers.

In the first embodiment, the rearranged bin numbers are referred to as the converted pointers, and the order of the calculation of the histogram intersection to be executed is controlled depending on these converted pointers, but in the third embodiment, the sequential numbers are referred to as calculation-order pointers, and the order of the calculation of the histogram intersection to be executed is controlled depending on the calculation-order pointers. In other words, the calculation order table is a conversion table which converts a calculation order pointer to a bin pointer indicating a bin number of the histogram to be referred to at that time.

The histogram intersection calculating unit 15 calculates the histogram intersection between the query image VW histogram and the target image VW histogram to obtain a score value of the histogram intersection.

The calculation controlling unit 16 controls operations (start, cease, and finish) of other units in the calculation unit 1 and also serves as an interface between the calculation unit 1 and other units composing the similar-image data retrieval system.

In particular, the calculation of the histogram intersection is performed by the histogram intersection calculating unit 15 under concurrency control in accordance with the value of the calculation order pointers "p" (=1 to P max: P max is the number of terms in the calculation order table) of the calculation controlling unit 16.

In other words, the calculation controlling unit 16 refers to the calculation order table using the value of the calculation order pointer "p" to obtain a value of a bin pointer "q". Further, the calculation controlling unit 16 refers to the image database 5 using the value of the bin pointer "q", thereby obtaining a frequency value HB(q) in the bin number "q" of the target image VW histogram, and also refers to the query image VW histogram storing area 42 to obtain a frequency value HA(q) in the bin number "q" of the query image VW histogram, and sends these frequency values HB(q) and HA(q) to the histogram intersection calculating unit 15.

Using the frequency value HA(q) of the bin number "q" of the query image VW histogram and the frequency value HB(q) of the bin number "q" of the target image VW histogram, where "p" is the calculation order pointer, the histogram intersection calculating unit 15 operates the following formula (3) to calculate a MIN cumulative value "Dp" (score value).

$$Dp = Dp-1 + \min(HA(q), HB(q)) \qquad (3)$$

Figure 7:
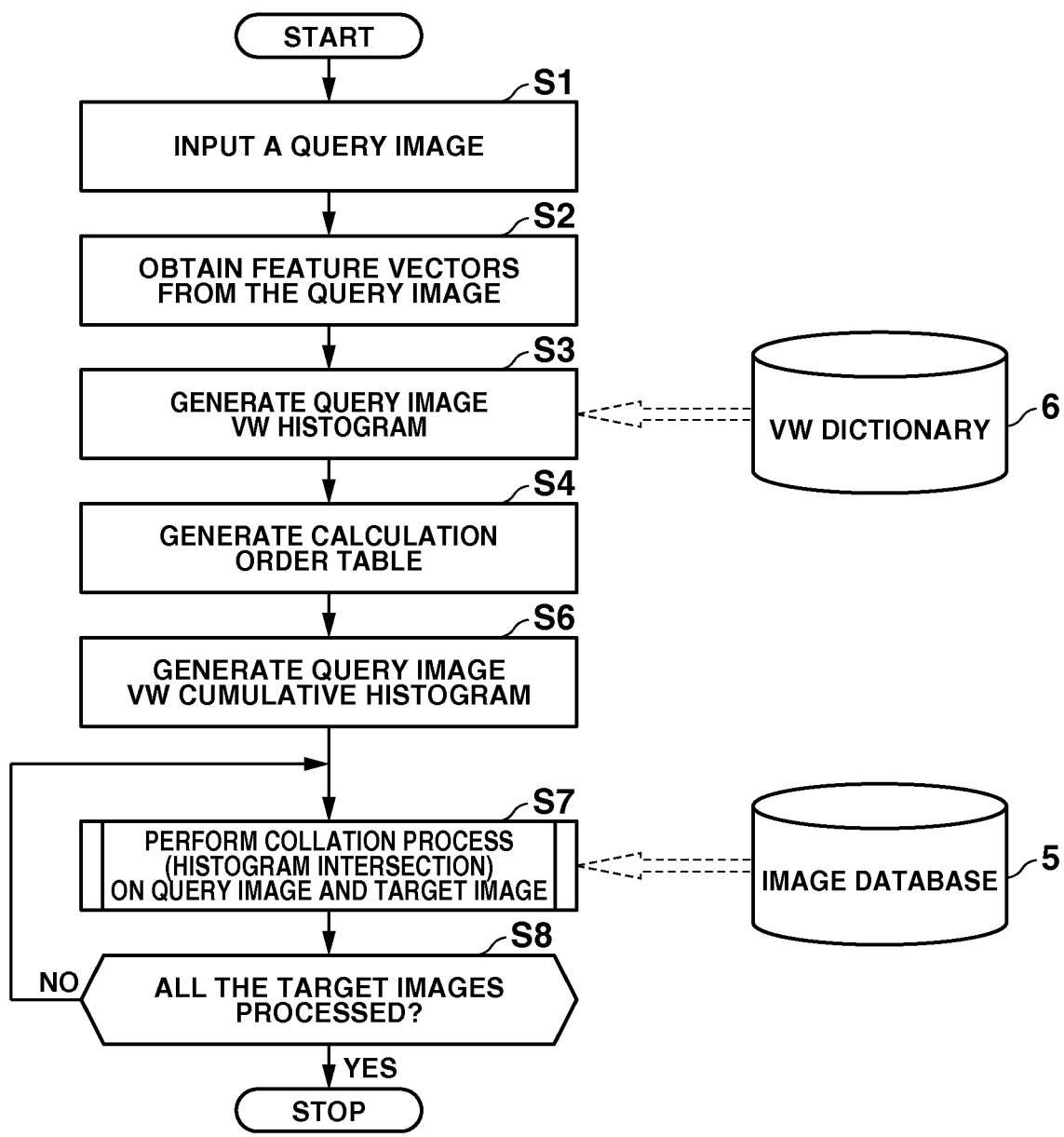
FIG. 7 is a flow chart of whole operation performed in the similar-image data retrieval system according to the third embodiment of the invention.

Now, the operation of the histogram intersection calculating device, the data collating device, and the similar data retrieval device according the third embodiment of the invention will be described. The whole operation of the similar-image data retrieval system of the third embodiment is substantially the same as the operation in the first embodiment of the invention, and is performed in accordance with the flow chart of FIG. 7. FIG. 7 is a flow chart of the whole operation performed in the similar-image data retrieval system according to the third embodiment of the invention.

In the similar-image data retrieval system according to the third embodiment, since the query image VW histogram is not rearranged, a process corresponding to the process (step S5 in FIG. 2) of rearranging the query image VW histogram is deleted from the flow chart of FIG. 7.

The calculation unit 1 rearranges the bin numbers of the query image VW histogram in descending order of frequency value, and assigns sequential numbers starting from 1 and incrementing by 1 to the rearranged bin numbers of the query image VW histogram with the bin numbers whose frequency value is 0 excluded, respectively, thereby creating the calculation order table (step S4 in FIG. 7). The process at step S4 in FIG. 7 is substantially the same as the process at step S4 in FIG. 2.

The cumulative histogram generating unit 21 accumulates frequency values falling in the bin number and succeeding bin numbers of the query image VW histogram for each bin number corresponding to the bin number given in the calculation order table to generate a query image VW cumulative histogram, and stores the generated query image VW cumulative histogram in the query image VW cumulative histogram storing area 45 of the storage unit 4 (step S6). The process at step S6 in FIG. 7 is substantially the same as the process at step S6 in FIG. 2.

The processes at the remaining steps are substantially the same as those at corresponding steps in FIG. 2 in the first embodiment, and the detailed description thereof is omitted.

Figure 8:
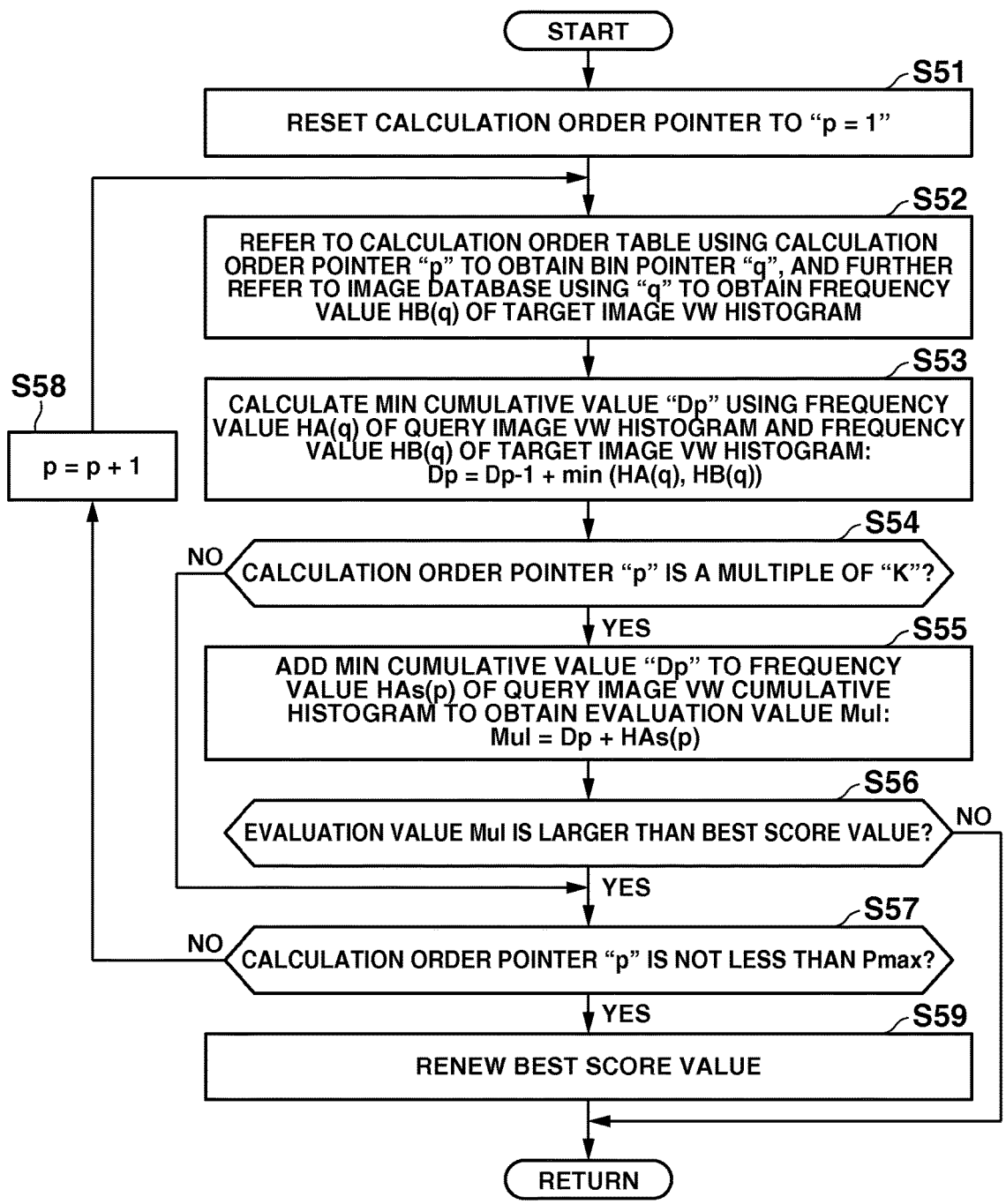
FIG. 8 is a flow chart of operation performed by the histogram intersection calculating device and the data collating device according to the third embodiment of the invention.

The collation process (step S7 in FIG. 7), including the calculation of the histogram intersection, to be executed on the query image and the target image, is performed in accordance with a flow chart shown in FIG. 8 in the present third embodiment. FIG. 8 is the flow chart illustrating the operation performed by the histogram intersection calculating device and the data collating device according to the third embodiment of the invention.

The calculation controlling unit 16 and the collation controlling unit 24 reset the value of the calculation order pointer "p" (=1 to P max) to the initial value "1" (step S51 in FIG. 8).

The calculation controlling unit 16 refers to the calculation order table using the value of the calculation order pointer "p" to obtain a value of a bin pointer "q", and refers to the image database 5 using the value of the bin pointer "q", thereby obtaining a frequency value HB (q) in the bin number "q" of the target image VW histogram (step S52) and sends the histogram intersection calculating unit 15 the frequency value HB (q) in the bin number "q" of the target image VW histogram. At the same time, the calculation controlling unit 16 refers to the query image VW histogram stored in the query image VW histogram storing area 42 to obtain and send a frequency value HA(q) in the bin number "q" to the histogram intersection calculating unit 15.

Using the frequency value HA(q) in the bin number "q" of the query image VW histogram and the frequency value HB (q) in the bin number "q" of the target image VW histogram, the histogram intersection calculating unit 15 operates the formula (3) to calculate the MIN cumulative value "Dp" (score value) of the calculation pointer "p" (step S53).

$$Dp = Dp-1 + \min(HA(q), HB(q)) \qquad (3)$$

Since the processes to be performed at step S54 and the successive steps are the substantially the same as those performed at the corresponding steps in the first embodiment, with exception that the converted pointer "p" is referred to as the calculation order pointer "p", the description thereof is omitted. But in the third embodiment of the invention, every time the histogram intersection is calculated, the frequency value HA(q) in the bin number "q" of the query image VW histogram and the frequency value HB (q) in the bin number "q" of the target image VW histogram, which are used in such calculation, are obtained, and therefore, when the calculation of the histogram intersection has not been finished for all the bin numbers of the query image VW histogram and the target image VW histogram (NO at step S57), the calculation order pointer "p" is incremented at step S58, and the process returns to step S52.

As described above, in the histogram intersection calculating device of the third embodiment of the invention, the bin numbers of the query image VW histogram are rearranged in descending order of frequency value and the bins whose frequency value is 0 are excluded from the query image VW histogram. Then, the sequential numbers starting from 1 and incrementing by 1 are assigned to the bin numbers in said rearranged query image VW histogram respectively to create the calculation order table. The calculation controlling unit 16 makes the histogram intersection calculating unit 15 calculate the histogram intersection in accordance with the order of the sequential number given in the calculation order table by using the frequency values in the bin number corresponding to the sequential number of the query image VW histogram and the target image VW histogram.

In the histogram intersection calculating device of the third embodiment of the invention, when the calculation order table indicating a relationship between the sequential numbers (values of calculation order pointers) and bin numbers (values of bin pointers) is created, since the bins whose frequency value is 0 are excluded from the query image VW histogram, the bins whose frequency value is 0 can be excluded from the calculation of the histogram intersection with no influence on the result of the calculation, reducing the number of calculation times or a calculation amount accompanied by the calculation of the histogram intersection to accelerate the calculation of the histogram intersection.

Comparing to the first embodiment of the invention, in the third embodiment every time the histogram intersection is calculated, the frequency value HB(q) in the bin number "q" of the target image VW histogram to be used in such calculation is obtained from the image database 5, and therefore, there is no need to rearrange the target image VW histogram, and the calculation of histogram intersection can be more accelerated compared with the calculation in the first embodiment.

In comparison with the second embodiment of the invention, in the third embodiment every time the histogram intersection is calculated, the frequency value HA (q) in the bin number "q" of the query image VW histogram to be used in such calculation is obtained, and therefore, there is no need to rearrange the query image VW histogram, and the calculation of histogram intersection can be more accelerated compared with the calculation in the second embodiment.

Similarly to the second embodiment of the invention, since it is possible to delete the process of rearranging the target image VW histogram for each target image which is processed as a processing unit by the data collation device, the data collating process can be accelerated, and also the similar data retrieval process can be accelerated in the similar data retrieval device.

In the above detailed description, the present invention has been described with reference to specific embodiments, but modifications and rearrangements may be made to the disclosed embodiments while remaining within the scope of the invention as defined by the following claims. It is intended to include all such modifications and rearrangements in the following claims and their equivalents.

For instance, in the first, second and third embodiments of the invention, "Bag-of-Features" ("BoF") is used, and a distribution of local features extracted from an image is expressed in a histogram of visual words, but can be expressed in other histogram-type such as a color histogram.

Further, in the first, second and third embodiments of the invention, the similar-image data retrieval system for retrieving images similar to a query image has been described, but the invention can be applied to a similar-image data system for retrieving media (sentences, video images, voices, and so on) other than the images. For example, when a sentence is a target to be retrieved, the local features are extracted from the sentence by using "Bag-of-Words" ("BoW"). The distribution of the extracted local features is expressed in a histogram of words. Then, the configurations of the first, second and third embodiments can be applied to the histogram of words without making any modification to them.

What is claimed is:

1. A data collation apparatus for collating query data with plural pieces of target data, the data collation apparatus comprising:
    a histogram intersection calculating unit which calculates a histogram intersection to compare a histogram of query data and a histogram of target data to obtain a score value of the histogram intersection;
    a calculation controlling unit which controls the histogram intersection calculating unit to calculate the histogram intersection in descending order of frequency value from a bin number having a maximum frequency value of the histogram of the query data, by using frequency values in bin numbers of the query data and frequency values in bin numbers of the target data, wherein the bin numbers of the target data correspond respectively to the bin numbers of the query data;
    a best score storing unit which stores score values of the histogram intersection calculated by the histogram intersection calculating unit and falling within a predetermined ranking counted from a best score value; and
    a judgment unit which successively judges whether a score value of the histogram intersection calculated by the histogram intersection calculating unit will be larger than the score value stored in the best score storing unit, while the histogram intersection calculating unit is calculating the score value of the histogram intersection,
    wherein when the judgment unit determines that the score value of the histogram intersection calculated by the histogram intersection calculating unit will not be larger than the score value stored in the best score storing unit, the histogram intersection calculating unit ceases the calculation of the histogram intersection, and
    wherein when the judgment unit determines that the score value of the histogram intersection finally calculated by the histogram intersection calculating unit is larger than the score value stored in the best score storing unit, the judgment unit renews the score value stored in the best score storing unit.

2. The data collation apparatus according to claim 1, wherein the calculation controlling unit comprises:
    a first rearranging unit which rearranges bins of the histogram of the query data in descending order of frequency value;
    a bin number conversion table generating unit which generates a bin number conversion table that indicates to which bin number the bin of the query histogram rearranged by the first rearranging unit corresponds, before the bin has been rearranged by the first rearranging unit; and
    a second rearranging unit which rearranges bins of the histogram of the target data in accordance with the bin number conversion table generated by the bin number conversion table generating unit, and
    wherein the calculation controlling unit controls the histogram intersection calculating unit to calculate the histogram intersection in order of bin from the bin having the maximum frequency value of the histogram of the query data rearranged by the first rearranging unit by using frequency values in the bin numbers of the query data and frequency values in the bin numbers of the target data rearranged by the second rearranging unit.

3. The data collation apparatus according to claim 1, wherein the calculation controlling unit comprises:
    a first rearranging unit which rearranges bins of the histogram of the query data in descending order of frequency value; and
    a bin number conversion table generating unit which generates a bin number conversion table that indicates to which bin number the bin of the query histogram rearranged by the first rearranging unit corresponds, before the bin has been rearranged by the first rearranging unit, and
    wherein the calculation controlling unit controls the histogram intersection calculating unit to calculate the histogram intersection in order of bin from the bin having the maximum frequency value of the histogram of the query data rearranged by the first rearranging unit by using frequency values in the bin numbers of the histogram of the query data and frequency values in not-rearranged bin numbers of the histogram of the target data, wherein the not-rearranged bin numbers of the target data correspond to the bin numbers of the query data in the bin number conversion table.

4. The data collation apparatus according to claim 1, wherein the calculation controlling unit comprises:
a calculation order table generating unit which rearranges bins of the histogram of the query data in descending order of frequency value, and assigns the rearranged bins of the histogram excluding bins whose frequency value is zero with sequential numbers starting from 1 and incrementing by 1 respectively to generate a calculation order table, and
wherein the calculation controlling unit controls the histogram intersection calculating unit to calculate the histogram intersection in order of the sequential numbers in the calculation order table by using frequency values in the bin numbers of the histogram of the query data and frequency values in the bin numbers of the histogram of the target data, wherein the bin numbers correspond to the sequential numbers respectively.

5. The data collation apparatus according to claim 1, further comprising:
a first rearranging unit which rearranges bins of the histogram of the query data in descending order of frequency value,
wherein the judgment unit comprises:
a cumulative histogram generating unit which generates a cumulative histogram by accumulating, for each bin number of the histogram of the query data rearranged by the first rearranging unit, frequency values in subsequent bin numbers; and
an adding unit which adds a score value for the bin number calculated by the histogram intersection calculating unit and a cumulative value in the bin number of the cumulative histogram generated by the cumulative histogram generating unit to calculate an addition value, and
wherein the histogram intersection calculating unit ceases the calculation of the histogram intersection, when the addition value calculated by the adding unit is smaller than the score value stored in the best score storing unit.

6. The data collation apparatus according to claim 1, further comprising:
a first rearranging unit which rearranges bins of the histogram of the query data in descending order of frequency value,
wherein the judgment unit comprises:
a cumulative histogram generating unit which generates a cumulative histogram by accumulating, for each bin number of the histogram of the query data rearranged by the first rearranging unit, frequency values in bin numbers; and
an adding unit which adds a score value for the bin number calculated by the histogram intersection calculating unit and a cumulative value in the bin number of the cumulative histogram generated by the cumulative histogram generating unit to calculate an addition value, and
wherein the histogram intersection calculating unit ceases the calculation of the histogram intersection, when the addition value calculated by the adding unit is smaller than a prescribed value.

7. The data collation apparatus according to claim 1, further comprising:
a calculation order table generating unit which rearranges bins of the histogram of the query data in descending order of frequency value, and assigns the rearranged bins of the histogram excluding bins whose frequency value is zero with sequential numbers starting from 1 and incrementing by 1 respectively to generate a calculation order table,
wherein the judgment unit comprises:
a cumulative histogram generating unit which generates a cumulative histogram by accumulating, for each bin number of the histogram of the query data corresponding to the bin number in the calculation order table, frequency values in subsequent bin numbers; and
an adding unit which adds a score value for the bin number calculated by the histogram intersection calculating unit and a cumulative value in the bin number of the cumulative histogram generated by the cumulative histogram generating unit to calculate an addition value, and
wherein the histogram intersection calculating unit ceases the calculation of the histogram intersection, when the addition value calculated by the adding unit is smaller than the score value stored in the best score storing unit.

8. The data collation apparatus according to claim 1, further comprising:
a calculation order table generating unit which rearranges bins of the histogram of the query data in descending order of frequency value, and assigns the rearranged bins of the histogram excluding bins whose frequency value is zero with sequential numbers starting from 1 and incrementing by 1 respectively to generate a calculation order table,
wherein the judgment unit comprises:
a cumulative histogram generating unit which generates a cumulative histogram by accumulating, for each bin number of the histogram of the query data corresponding to the bin number in the calculation order table, frequency values in subsequent bin numbers; and
an adding unit which adds a score value for the bin number calculated by the histogram intersection calculating unit and a cumulative value in the bin number of the cumulative histogram generated by the cumulative histogram generating unit to calculate an addition value, and
wherein the histogram intersection calculating unit ceases the calculation of the histogram intersection, when the addition value calculated by the adding unit is smaller than a prescribed value.

9. A similar data retrieval apparatus including the data collation apparatus according to claim 1, for retrieving data similar to query data from among plural pieces of target data, comprising:
a similar data outputting unit which outputs data similar to the query data from among the plural pieces of target data,
wherein the similar data outputting unit outputs as data similar to the query data the target data, for which the score value stored in the best score storing unit has been calculated.

10. A method of controlling a computer to collate query data with plural pieces of target data, the method comprising:
calculating a histogram intersection to compare a histogram of query data and a histogram of target data and obtaining a score value of the histogram intersection;
performing control of the calculating of the histogram intersection such that the calculation is performed in descending order of frequency value from a bin number having a maximum frequency value of the histogram of the query data, by using frequency values in bin numbers of the query data and frequency values in bin numbers of the target data, wherein the bin numbers of the target data correspond respectively to the bin numbers of the query data;

storing the calculated score values of the histogram intersection falling within a predetermined ranking counted from a best score value in a storing unit; and successively judging whether a calculated score value of the histogram intersection will be larger than the score value stored in the storing unit, while score values of the histogram intersection are successively calculated, wherein when it is determined that the calculated score value of the histogram intersection will not be larger than the score value stored in the storing unit, ceasing the calculation of the histogram intersection, and wherein when it is determined that the score value of the histogram intersection finally calculated is larger than the score value stored in the storing unit, renewing the score value stored in the storing unit.

11. A non-transitory computer readable recording medium having a program stored thereon to perform functions comprising:

calculating a histogram intersection to compare a histogram of query data and a histogram of target data to obtain a score value of the histogram intersection;

performing control of the calculating of the histogram intersection such that the calculation is performed in descending order of frequency value from a bin number having a maximum frequency value of the histogram of the query data, by using frequency values in bin numbers of the query data and frequency values in bin numbers of the target data, wherein the bin numbers of the target data correspond respectively to the bin numbers of the query data;

storing the calculated score values of the histogram intersection falling within a predetermined ranking counted from a best score value in a storing unit; and successively judging whether a calculated score value of the histogram intersection will be larger than the score value stored in the storing unit, while score values of the histogram intersection are successively calculated, wherein when it is determined that the calculated score value of the histogram intersection will not be larger than the score value stored in the storing unit, ceasing the calculation of the histogram intersection, and wherein when it is determined that the score value of the histogram intersection finally calculated is larger than the score value stored in the storing unit, renewing the score value stored in the storing unit.

* * * * *